United States Patent
Parsons

(10) Patent No.: US 8,258,654 B2
(45) Date of Patent: Sep. 4, 2012

(54) WIRELESS OCCUPANCY SENSING WITH PORTABLE POWER SWITCHING

(75) Inventor: Kevin Parsons, Wilsonville, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 172 days.

(21) Appl. No.: 12/503,381

(22) Filed: Jul. 15, 2009

(65) Prior Publication Data

US 2011/0012433 A1    Jan. 20, 2011

(51) Int. Cl.
*H01H 35/00* (2006.01)
(52) U.S. Cl. ........................................................ 307/116
(58) Field of Classification Search .................. 307/117, 307/116
See application file for complete search history.

(56) References Cited

U.S. PATENT DOCUMENTS

| | | | |
|---|---|---|---|
| 4,305,021 A * | 12/1981 | Schreiden .................. | 315/159 |
| 4,636,774 A * | 1/1987 | Galvin et al. .............. | 340/565 |
| 4,661,720 A * | 4/1987 | Cameron et al. ........... | 307/117 |
| 4,820,938 A * | 4/1989 | Mix et al. .................. | 307/117 |
| 4,890,093 A * | 12/1989 | Allison et al. ............. | 340/567 |
| 5,157,273 A | 10/1992 | Medendorp et al. | |
| 5,374,854 A * | 12/1994 | Chen ......................... | 307/117 |
| 5,448,290 A | 9/1995 | VanZeeland | |
| 5,455,487 A | 10/1995 | Mix et al. | |
| 5,476,221 A | 12/1995 | Seymour | |
| 5,489,827 A | 2/1996 | Xia | |
| 5,534,850 A * | 7/1996 | Lee ............................ | 340/565 |
| 5,538,181 A | 7/1996 | Simmons et al. | |
| 5,586,048 A * | 12/1996 | Coveley ..................... | 702/189 |
| 5,598,042 A | 1/1997 | Mix et al. | |
| D381,632 S | 7/1997 | Overthun | |
| 5,650,771 A * | 7/1997 | Lee ............................ | 340/656 |
| 5,670,940 A | 9/1997 | Holcomb et al. | |
| 5,673,022 A | 9/1997 | Patel | |
| 5,748,466 A | 5/1998 | McGivern et al. | |
| 5,764,146 A * | 6/1998 | Baldwin et al. ............ | 340/567 |
| 5,898,407 A | 4/1999 | Paulus et al. | |
| 5,905,442 A | 5/1999 | Mosebrook et al. | |
| 5,982,103 A | 11/1999 | Mosebrook et al. | |
| 6,078,253 A * | 6/2000 | Fowler ....................... | 340/501 |
| 6,380,852 B1 | 4/2002 | Hartman et al. | |

(Continued)

FOREIGN PATENT DOCUMENTS

KR    20-1998-0041190    9/1998

(Continued)

OTHER PUBLICATIONS

U.S. Appl. No. 12/434,543, filed May 1, 2009, not yet published, 23 pages.

(Continued)

*Primary Examiner* — Jared Fureman
*Assistant Examiner* — Adi Amrany
(74) *Attorney, Agent, or Firm* — Marger Johnson & McCollom PC

(57) ABSTRACT

A portable switching device may include a wireless receiver to receive a wireless signal from an occupancy sensor, and a power switch to control power to a load in response to the wireless signal. In some embodiments, the wireless signal may include an occupancy signal that indicates the occupied state of a monitored space. In other embodiments, the wireless signal may include a detector signal that requires further processing to determine the occupied state of the space.

19 Claims, 7 Drawing Sheets

U.S. PATENT DOCUMENTS

| | | | |
|---|---|---|---|
| 6,418,324 | B1 | 7/2002 | Doviak et al. |
| 6,587,739 | B1* | 7/2003 | Abrams et al. ................. 700/83 |
| 6,703,786 | B2 | 3/2004 | Tannenbaum |
| 6,720,874 | B2 | 4/2004 | Fufido et al. |
| 6,731,024 | B1* | 5/2004 | Molnar et al. ................ 307/147 |
| 6,756,998 | B1 | 6/2004 | Bilger |
| 6,888,323 | B1 | 5/2005 | Null et al. |
| 6,909,921 | B1 | 6/2005 | Bilger |
| 6,940,230 | B2 | 9/2005 | Myron et al. |
| 6,956,493 | B1 | 10/2005 | Youngblood |
| 6,993,417 | B2* | 1/2006 | Osann, Jr. ..................... 700/291 |
| 7,027,416 | B1 | 4/2006 | Kriz |
| 7,071,672 | B2 | 7/2006 | Drusenthal |
| 7,123,139 | B2 | 10/2006 | Sweeney |
| 7,155,317 | B1* | 12/2006 | Tran .............................. 700/259 |
| 7,230,532 | B2 | 6/2007 | Albsmeier et al. |
| 7,415,310 | B2 | 8/2008 | Bovee et al. |
| 7,511,613 | B2 | 3/2009 | Wang |
| 7,522,036 | B1* | 4/2009 | Preuss et al. .................. 340/531 |
| 7,541,924 | B2 | 6/2009 | Elwell |
| 7,544,941 | B2 | 6/2009 | Gorman et al. |
| 7,626,339 | B2* | 12/2009 | Paton ............................ 315/155 |
| 7,688,005 | B2 | 3/2010 | Reid |
| 7,765,033 | B2* | 7/2010 | Perry ............................ 700/275 |
| 7,830,133 | B2 | 11/2010 | Williams et al. |
| 7,918,406 | B2 | 4/2011 | Rosen |
| 7,940,167 | B2 | 5/2011 | Steiner et al. |
| 8,009,042 | B2 | 8/2011 | Steiner et al. |
| 8,018,166 | B2 | 9/2011 | Soccoli et al. |
| 2002/0023233 | A1 | 2/2002 | O'Meany |
| 2002/0135476 | A1 | 9/2002 | McKinney et al. |
| 2003/0073342 | A1 | 4/2003 | Geyer |
| 2005/0030177 | A1 | 2/2005 | Albsmeier et al. |
| 2005/0132408 | A1 | 6/2005 | Dahley et al. |
| 2006/0125624 | A1* | 6/2006 | Ostrovsky et al. ............ 340/527 |
| 2007/0075852 | A1 | 4/2007 | Schmidt et al. |
| 2007/0132318 | A1 | 6/2007 | Schmidt et al. |
| 2007/0222584 | A1 | 9/2007 | Albsmeier et al. |
| 2007/0272293 | A1 | 11/2007 | Schmidt |
| 2007/0276548 | A1 | 11/2007 | Uzunovic et al. |
| 2007/0290621 | A1* | 12/2007 | Clark et al. ................... 315/113 |
| 2008/0024007 | A1* | 1/2008 | Budampati et al. ............ 307/19 |
| 2008/0068204 | A1 | 3/2008 | Carmen et al. |
| 2008/0094210 | A1* | 4/2008 | Paradiso et al. ............... 340/540 |
| 2008/0111491 | A1 | 5/2008 | Spira |
| 2008/0136663 | A1 | 6/2008 | Courtney et al. |
| 2008/0176608 | A1* | 7/2008 | Budampati et al. ........... 455/572 |
| 2008/0218099 | A1 | 9/2008 | Newman |
| 2008/0303661 | A1 | 12/2008 | Chick |
| 2009/0049466 | A1 | 2/2009 | Schoettle et al. |
| 2009/0101386 | A1 | 4/2009 | Schoettle |
| 2009/0102679 | A1* | 4/2009 | Schoettle .................. 340/815.4 |
| 2009/0135006 | A1* | 5/2009 | Schoettle ..................... 340/540 |
| 2009/0137163 | A1* | 5/2009 | Schoettle ..................... 439/894 |
| 2009/0195704 | A1 | 8/2009 | Bombara |
| 2009/0219245 | A1 | 9/2009 | Frankel et al. |
| 2009/0278472 | A1* | 11/2009 | Mills et al. .................... 315/294 |
| 2010/0007801 | A1 | 1/2010 | Cooper et al. |
| 2010/0207759 | A1* | 8/2010 | Sloan et al. ................... 340/540 |
| 2010/0237711 | A1* | 9/2010 | Parsons ......................... 307/116 |
| 2010/0237781 | A1* | 9/2010 | Dupre et al. ................... 315/86 |
| 2010/0237783 | A1* | 9/2010 | Dupre et al. ................... 315/149 |
| 2010/0277306 | A1* | 11/2010 | Leinen et al. ................ 340/539.3 |
| 2010/0308664 | A1* | 12/2010 | Face et al. ..................... 307/104 |
| 2010/0315196 | A1 | 12/2010 | Schmidt et al. |
| 2011/0036699 | A1 | 2/2011 | Daffin, III |
| 2011/0074225 | A1* | 3/2011 | Delnoij et al. ................ 307/117 |
| 2011/0080529 | A1 | 4/2011 | Wong |
| 2011/0090042 | A1* | 4/2011 | Leonard et al. ............... 340/5.1 |
| 2011/0210622 | A1* | 9/2011 | Han .............................. 307/116 |
| 2011/0282509 | A1* | 11/2011 | Yegin et al. ................... 700/295 |

FOREIGN PATENT DOCUMENTS

| | | |
|---|---|---|
| KR | 610-2008-010549 | 12/2008 |
| KR | 10-2009-0130800 | 12/2009 |

OTHER PUBLICATIONS

Energy Conservation—Home and Office, echoflex, EnOcean Alliance, Oct. 20, 2008 (earliest suspected availability date extracted from digital document), Squamish, B.C., Canada, 41 pages.
Bach, DEMO of Self-Powered PIR Radio Sensor, Application Note AN013, EnOcean, Jan. 2007, 8 pp.
User Reference Guide, 8 Outlet Power Strip with Personal Sensor, IDP-3050-A version 2, Nov. 2007, Isole, WattStopper, Santa Clara, CA, 4 pp.
Installation Instructions, 8 Outlet Power Strip with Personal Sensor, IDP-3050-A version 2, Jan. 2008, ISOLe, WattStopper, Santa Clara, CA, 8 pp.
Bach, Power Supply Layout—Layout considerations for Line-Power Supplies, Application Note 101, EnOcean, Jan. 20, 2009, 4 pp.
Bach, Motion Sensor—Design Example for an Ambient Light Powered PIR, Application Note 306, EnOcean, Jan. 21, 2009 (earliest suspected availability date extracted from digital document), 7 pp.
Frequently Asked Questions, Airwave, Ledalite, Mar. 1, 2009, 6 pp.
Technical Guide, Airwave, Ledalite, Mar. 5, 2009, 14 pp.
Airwave Specification Overview, Airwave, Wireless by Ledalite, Mar. 4, 2009, 2 pp.
Isole Plug Load Controls, WattStopper, Santa Clara, CA, Jan. 7, 2009, 8 pp.
Concept of a Occupancy Sensor Light Switch, Application Note AN012, EnOcean, Sep. 2007, Germany, 2 pp.
Bach, Self-Powered PIR Radio Sensor starting at 40 lx, Application Note AN013A, EnOcean, Aug. 2007, Germany, 4 pp.
Bach, Ambient light powered occupancy sensor for Indoor, Application Note, EnOcean, Dec. 2006, Germany, 3 pp.
Heath/Zenith Wireless Outdoor Power Control, Model 6022, HeathCo LLC, Bowling Green, KY, 2007, 20pp.
New Occupancy/Vacancy Sensor Sets a Higher Performance Standard, Lutron Electronics Co., Inc., Coopersburg, PA, Jun. 9, 2009, 1 page.
Black, Rich, Lutron RF Technology . . . Reliable, First, Forward Thinking, Lutron Electronics Co., Inc., Coopersburg, PA, Aug. 2006, 15 pp.
Kropelin et al., APC UPS Daemon, "APCUPSDE User Manual," Jul. 31, 2009, 111 pp.
Bulogics, "Home Automation—Light, Your Way, Product Overview," 2008, 11 pp.Bulogics, Our Gadgets: USB Shutdown Stick, Mar. 31, 2010, 1 page.
Bulogics, Our Gadgets: USB Shutdown Stick, Mar. 31, 2010, 1 page.
EMX Industries, "BlueGuard Bluetooth Enabled Stand-Alone Access Control," Cleveland, OH, May 6, 2009, 2pp.
Leviton, S1000/S2000 Series, Leviton Surge Strips, "Quality Protection. Everyday Application," Product Info Sheet, May 10, 2010, 2 pp.
Leviton, TVSS Master Specs, Section 16478, Transient Voltage Surge Suppression (Surge Protective Devices), May 10, 2010, 6 pp.
National Electrical Manufacturers Association, "NEMA Guide Publication WD Jul. 2000—Occupancy Motion Sensors," 2000, 16 pp.
Northern Softworks, "Welcome to Northern Softworks," Lights Out, Dec. 15, 2009, 1 page.
SmartHomeUSA, "Smart Strip, Power Strip—User's Guide," for Models LCG1, LCG2, LCG3, LCG4, LCG5, Dec. 15, 2009, 4 pp.
SmartHomeUSA, "Smart Strip Power Strip with Coax, Fax & Modem Protection," Dec. 15, 2009, 5 pp.
Cornfield Electronics, Inc., "How Does TV-B-Gone Work?,"2009, 1 page.
Leviton, "Infrared Repeater system—Component Specifications," Part Nos. 47621-MIE, 47621-CMS, 47603-110, 2001, 2 pp.
U.S. Appl. No. 12/778,014, filed May 11, 2010, not yet published, 30 pages.
U.S. Appl. No. 12/649,697, filed Dec. 30, 2009, not yet published 18 pages.
OPUS-FUNK plus, Jager Direkt GmbH & Co., Jul. 2, 2006, Germany, 2 pp.
Wireless Ceiling Multi Sensor 360°, SR-MDS, thermokon Sensortechnik GmbH, Dec. 2007, Germany, 7 pp.
BlueGuard Bluetooth Enabled Stand-Alone Access Control, EMX Industries, Inc., Cleveland, OH, May 6, 2009, 2pp.

Enocean, "Perpetuum—Maintenance-Free Wireless Switches & Sensors," vol. 4, Issue 05, International Edition, Apr. 2007, 56 pages.

Enocean, "Concept of a Occupancy Sensor Light Switch—RF Technology Without Batteries," Bach, Aug. 2006, 2 pages.

Enocean, "DEMO of Self-Powered PIR Radio Sensor—RF Technology Without Batteries," Bach, Jan. 2007, 8 pages.

Enocean, "Indoor Mounting of Solar Powered Sensors—RF Technology Without Batteries," Bach, Sep. 2006, 3 pages.

International Search Report and Written Opinion for PCT/US2011/024421, dated Oct. 14, 2011, 9 pages.

Vishay Semiconductors, "Data Formats for IR Remote Control," Document No. 80071, Rev. 1.8, Jul. 28, 2010, pp. 11-14.

Leviton Manufacturing Co., Inc., "Infrared Ceiling Mounted Occupany Sensors," Installation Instructions, 2005, 2 pages.

* cited by examiner

WIRELESS OCCUPANCY SENSING WITH PORTABLE POWER SWITCHING

BACKGROUND

Occupancy sensing technologies are used to monitor the presence of human occupants in indoor and outdoor spaces. Occupancy sensing systems conserve energy by automatically turning off lighting and other electrical loads when the space is unoccupied. They may also perform a convenience function by automatically turning on lighting and other loads when an occupant enters a space.

An occupancy sensing system generally includes at least two major components: an occupancy sensor and a switching device. The sensor generally needs to be positioned in a location that is selected to have a clear view of the entire space that is to be monitored for occupants. This type of location, however, is typically not convenient for the switching device. Therefore, occupancy sensor systems generally include control wiring that runs between the occupancy sensor and the switching devices. This additional wiring tends to be expensive and time consuming to install. It may also be a source of system failures that are difficult to diagnose if the wiring is concealed in walls. Moreover, once the wiring is installed, it is difficult to reconfigure the system if there is a change in the type or location of loads that are to be controlled by the occupancy sensor.

DETAILED DESCRIPTION

Some of the inventive principles of this patent disclosure relate to the use of a portable switching device in a wireless occupancy sensing system.

Figure 1:
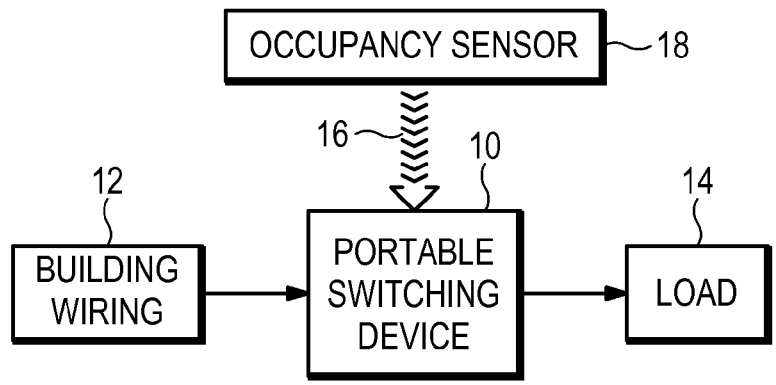
FIG. 1 illustrates an embodiment of a wireless occupancy sensing system having a portable switching device according to some of the inventive principles of this patent disclosure.

FIG. 1 illustrates an embodiment of a wireless occupancy sensing system having a portable switching device according to some of the inventive principles of this patent disclosure. The system of FIG. 1 includes a portable switching device 10 to control the flow of power from a building wiring system 12 to an electrical load 14 in response to a wireless signal 16 received from an occupancy sensor 18.

The portable switching device 10 may be portable in the sense that it may be removed from an interior or exterior building space without disconnecting any permanent building wiring. For example, the portable switching device may be implemented with a cord-connected power strip that may be removed from a first office by unplugging it from a receptacle and moved to second office. As another example, the portable switching device may be implemented with a screw-base adapter that may be connected between a light bulb and a screw-type light socket.

In some embodiments, the wireless signal from the occupancy sensor may be implemented as an occupancy signal that provides a relatively high-level indication of whether the monitored space is occupied or not. For example, the wireless signal may be encoded as a binary signal where one state indicates the space is occupied, and the other state indicates the space is not occupied. A binary occupancy signal may have refinements such as a delay time integrated into the signal, i.e., the signal does not switch from the occupied to the unoccupied state until the space has been unoccupied for the entire duration of the delay time.

In other embodiments, the wireless signal from the occupancy sensor may be implemented as a detector signal that provides a relatively low-level indication of a physical stimulus being sensed by a detector in the occupancy sensor. For example, in an occupancy sensor that uses passive infrared (PIR) sensing technology, the wireless signal may be encoded to transmit primitive signals or raw data from the PIR detector. Such signals or data may then be processed in the portable switching device to determine whether the monitored space is occupied.

In this and any other embodiments, the wireless signal from the occupancy sensor may be transmitted in any suitable form, for example, radio frequency (RF) signals, infrared (IR) signals, ultrasonic signals, etc.

Figure 2:
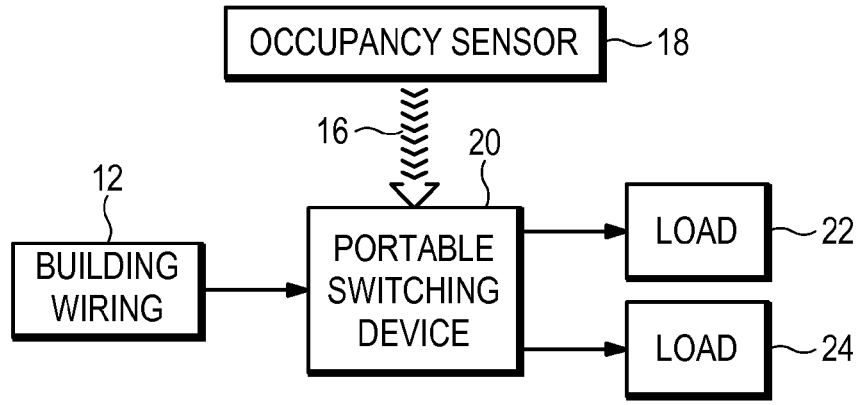
FIG. 2 illustrates another embodiment of a wireless occupancy sensing system having a portable switching device according to some of the inventive principles of this patent disclosure.

FIG. 2 illustrates another embodiment of a wireless occupancy sensing system having a portable switching device according to some of the inventive principles of this patent disclosure. In the system of FIG. 2, the portable switching device 20 may be configured to control power to two separate loads 22 and 24 independently in response to the wireless signal from the occupancy sensor. For example, in some embodiments, one of the loads may always be energized, or may be controlled by a master switch, while the other load may be controlled by the wireless signal from the occupancy sensor. In other embodiments, both loads may be controlled by the wireless signal from the occupancy sensor, but with different delay times, different levels of sensitivity, etc. In yet other embodiments, one of the loads may be controlled by the wireless signal from the occupancy sensor, while the other load may be controlled by a combination of an ambient light detector, as well as the wireless signal from the occupancy sensor.

Figure 3:
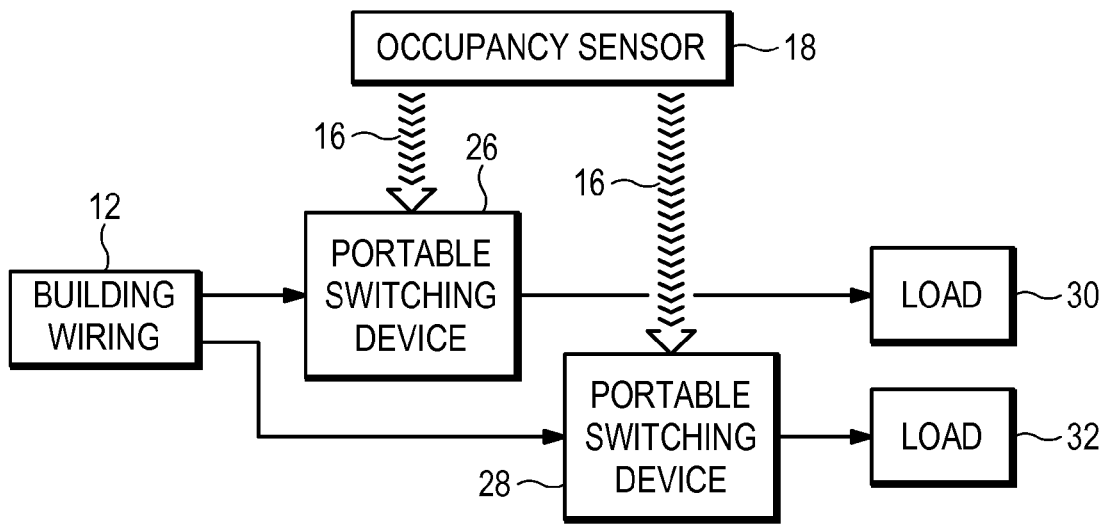
FIG. 3 illustrates an embodiment of a wireless occupancy sensing system having two or more portable switching devices according to some of the inventive principles of this patent disclosure.

FIG. 3 illustrates an embodiment of a wireless occupancy sensing system having two or more portable switching devices according to some of the inventive principles of this patent disclosure. In the system of FIG. 3, two different portable switching devices 26 and 28 may be configured to control power to two separate loads 30 and 32 in response to the wireless signal from the occupancy sensor. For example, in some embodiments, the first portable switching device 26 may be implemented with a screw-base adapter to turn off a task light as soon as an occupant has left a cubical that is monitored by the occupancy sensor, but the second portable switching device 28 may be implemented with a power strip configured to turn off a computer monitor and printer 30-minutes after the occupant has left the cubical.

Figure 4:
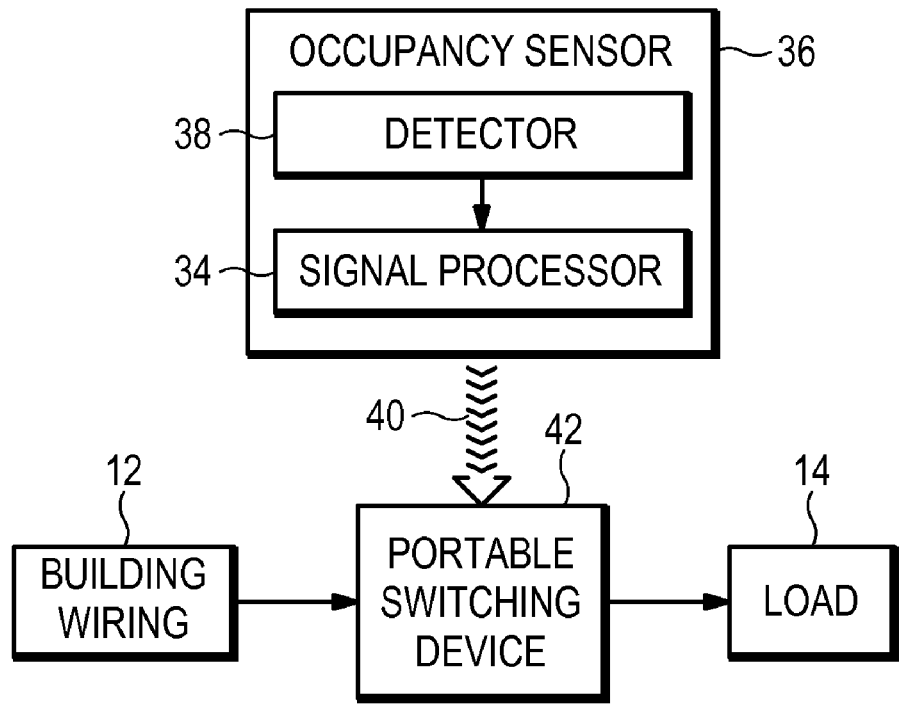
FIG. 4 illustrates an example technique for processing a signal from a detector according to some of the inventive principles of this patent disclosure.

FIG. 4 illustrates an example technique for processing a signal from a detector according to some of the inventive principles of this patent disclosure. In the embodiment of FIG. 4, a signal processor 34 is included in an occupancy sensor 36 to process signals from a detector 38. The signal processor may include all of the functionality to process a raw signal from the detector, as well as logic to make the final determination of whether the monitored space should be considered occupied.

For example, with an occupancy sensor based on PIR sensing technology, the detector 38 may include a semiconductor chip with one or more pyroelectric detectors that generate a voltage that changes in response to changes in the amount of infrared energy in the field of view. In this example, the signal processor 34 may include amplifiers, comparators, logic, etc. to determine whether a change in the amount of infrared energy is caused by the motion of an actual occupant or by some other source of infrared energy such as background energy from ambient light. The signal processor may also include logic to implement features such as a delay time to prevent false unoccupied readings. The final output from the signal processor is a binary occupancy signal that indicates whether the monitored space is occupied or unoccupied. The occupancy signal is transmitted as the wireless signal 40 to a portable switching device 42.

Although the example of FIG. 4 is shown with only one detector, multiple detectors may be used. For example, some embodiments may include both PIR and ultrasound detectors, in which case, the signal processor may include circuitry to process changes in the output of the PIR detector, as well as detecting Doppler shift in the output from an ultrasound transducer. The signal processor may also include logic to make the final occupancy determination by combining the information from the PIR and ultrasound detectors.

In the embodiment of FIG. 4, and in any other embodiments, the signal processor 34 and any other circuitry and/or logic may be implemented in analog and/or digital hardware, software, firmware, etc., or any combination thereof.

Figure 5:
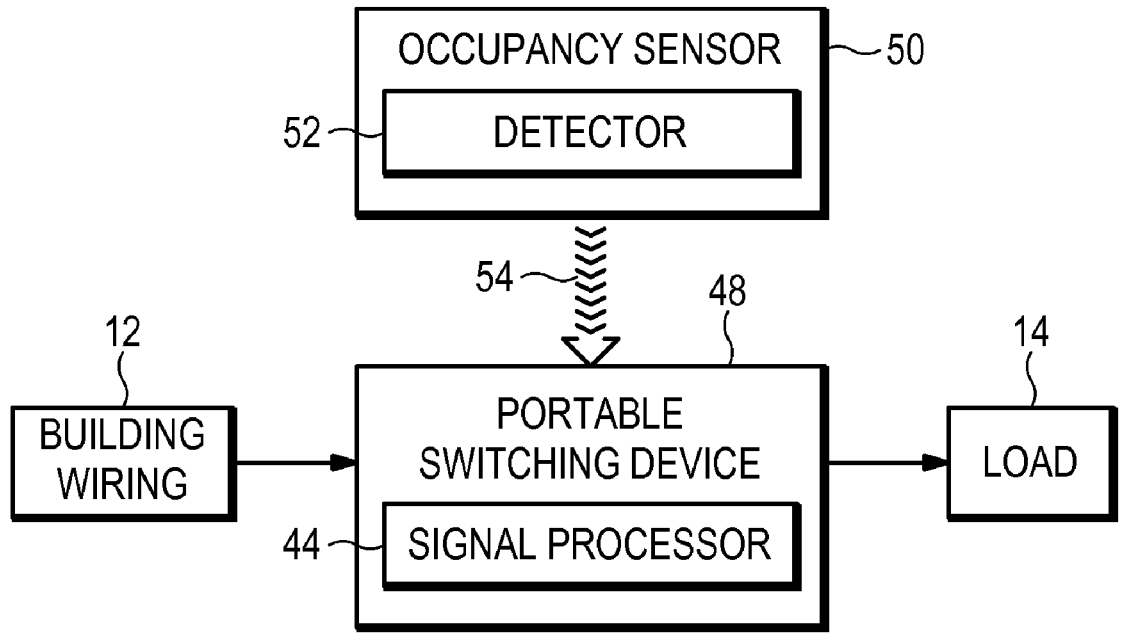
FIG. 5 illustrates another example technique for processing a signal from a detector according to some of the inventive principles of this patent disclosure.

FIG. 5 illustrates another example technique for processing a signal from a detector according to some of the inventive principles of this patent disclosure. In the embodiment of FIG. 5, the signal processor 44 is moved to the portable switching device 48. Rather than transmitting an occupancy signal, the occupancy sensor 50 transmits a detector signal that provides a relatively low-level indication of a physical stimulus being sensed by the detector 52 in the occupancy sensor. For example, in an occupancy sensor that uses PIR sensing technology, the occupancy sensor may transmit the value of the voltage output from the PIR detector in analog or digital form on the wireless signal 54. The signal processor 44 in the portable switching device 48 may then perform the processing to determine whether a change in the amount of infrared energy received at the detector 52 is caused by the motion of an actual occupant. The signal processor 44 may also include logic to implement features such as a delay time, sensitivity adjustment, etc. The portable switching device 48 then uses the occupancy determination to control the flow of power to an electrical load 14.

In some embodiments, the signal processing functions may be distributed between multiple components. For exampled, the occupancy sensor may include some rudimentary signal processing in which the detector signal is converted to a digital form with an analog-to-digital converter (ADC). In such an embodiment, some amount of filtering may be included in the occupancy sensor as well. The digitized detector signal may then be transmitted to the portable switching device where additional signal processing circuitry may complete the processing to make the occupancy determination.

In other embodiments, signal processing for multiple detectors may be distributed between multiple components. For example, with an occupancy sensor that uses a combination of PIR and video sensing, the signal processing for the PIR detector, which may require relatively little processing power, may be performed at the occupancy sensor, while processing for the video detector, which may require more processing power, may be performed at the portable switching device. In this example, the wireless signal may include a binary occupancy signal relating to the PIR portion, and a more complex detector signal relating to the video portion. Logic at the portable switching device may combine the binary PIR occupancy signal with the output from the video processing to make a final occupancy determination.

Figure 6:
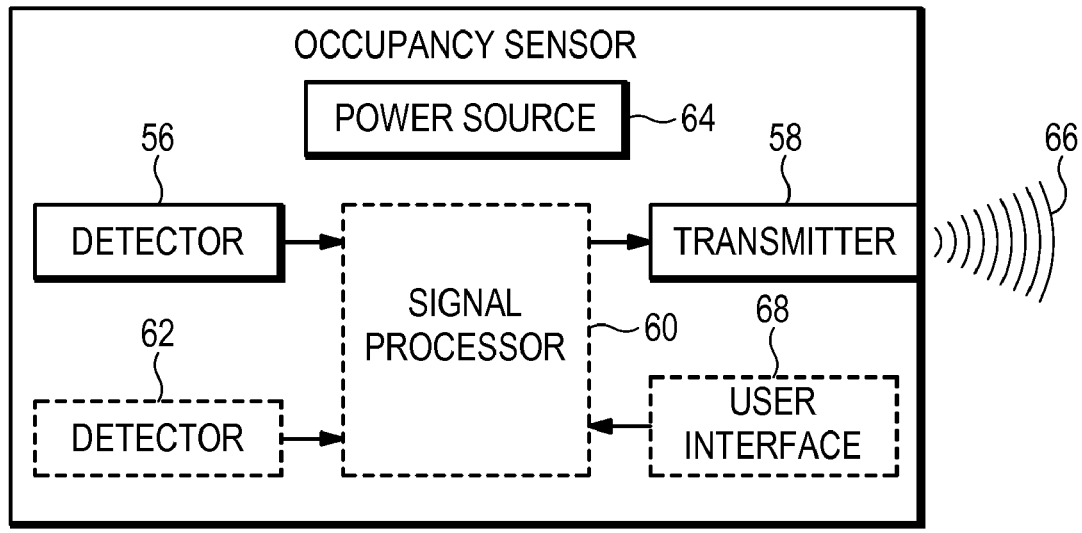
FIG. 6 illustrates an embodiment of a wireless occupancy sensor according to some of the inventive principles of this patent disclosure.

FIG. 6 illustrates an embodiment of a wireless occupancy sensor according to some of the inventive principles of this patent disclosure. The system of FIG. 6 includes a detector 56 and a wireless transmitter 58. In some embodiments, the detector may be coupled directly to the transmitter to transmit the detector signal as a relatively low-level indication of a physical stimulus sensed by a detector, for example, by transmitting a primitive signal or raw data from the detector on the wireless signal 66. In other embodiments, the occupancy sensor may include a signal processor 60 to process the detector signal and determine whether the space monitored by the detector is occupied. In such an embodiment, the signal processor may output a binary occupancy signal that is transmitted as the wireless signal 66 and indicates whether the monitored space is occupied or unoccupied. The signal processor may include logic to implement additional features such as a delay time, variable sensitivity, etc.

The occupancy sensor may also include one or more additional detectors 62. In some embodiments, the output of an additional detector may be coupled directly to the transmitter 58, while in other embodiments, the output of an additional detector may be processed by the signal processor 60. Alternatively, one or more additional transmitters may be included to transmit the output signal for one or more additional detectors, with or without subjecting the detector signal to signal processing.

The transmitter 58 may transmit the wireless signal 66 using any suitable wireless transmission technology. Examples include infrared transmission using a standard from the Infrared Data Association (IrDA), RF transmission using one of the many standards developed by the Institute of Electrical and Electronic Engineers (IEEE), or any other standardized and/or proprietary wireless communication technology.

A user interface 68 may be included to enable a user to configure the system, adjust parameters, etc. For example, the user interface may enable a user to set an unoccupied delay time, detector sensitivity, learn mode, etc. A user interface may be implemented with any level of sophistication from a simple push-button switch with no user feedback to a keypad with full text display, etc.

A power source 64 provides power to operate some or all of the various components of the occupancy sensor. In some embodiments, the power source may be provided from an external source, for example, by a hardwired connection to a 24 VDC power supply, a 120 VAC branch circuit, etc. In other embodiments, the power source may be internal, for example, one or more batteries, fuel cells, photovoltaic cells, etc. Other embodiments may include combinations of these various types of power sources. For example, primary power may be provided by a 120 VAC circuit, which maintains a backup battery in a charged state to provide power in the event of a loss of the 120 VAC circuit.

Figure 7:
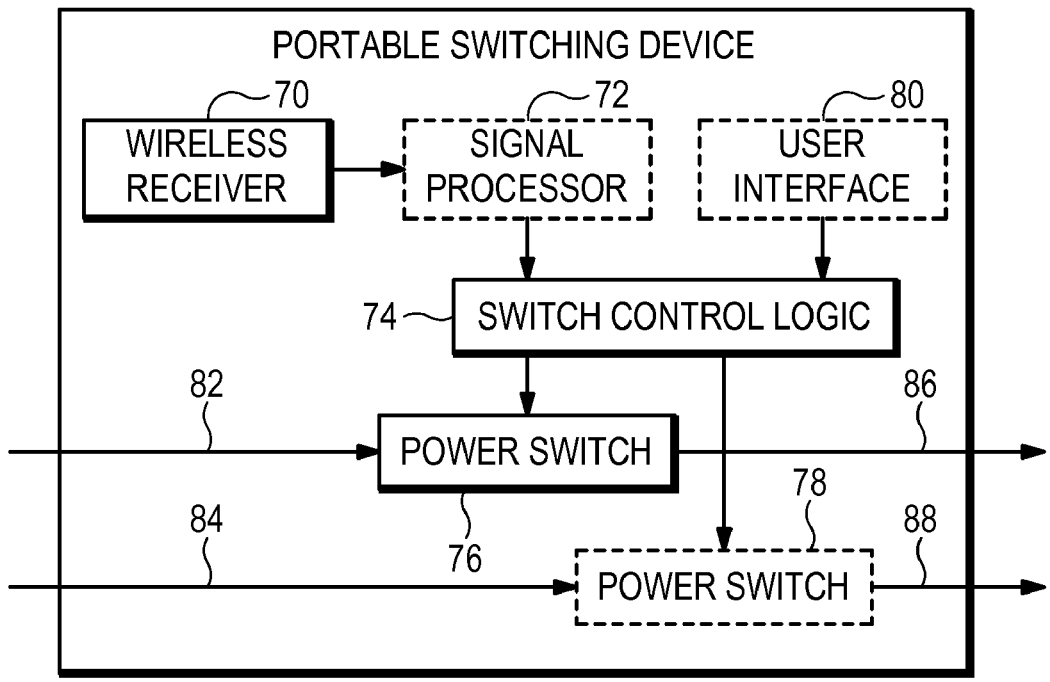
FIG. 7 illustrates an embodiment of a portable switching device for use in a wireless occupancy sensing system according to some of the inventive principles of this patent disclosure.

FIG. 7 illustrates an embodiment of a portable switching device for use in a wireless occupancy sensing system according to some of the inventive principles of this patent disclosure. The system of FIG. 7 includes a wireless receiver 70 to receive a wireless signal from an occupancy sensor using any suitable wireless transmission technologies, including those discussed above. A signal processor 72 may be included depending on the nature of the wireless signal. If the wireless signal is implemented as an occupancy signal that provides a relatively high-level indication of whether the monitored space is occupied, the signal processor may be omitted. In other embodiments, if the wireless signal from the occupancy sensor is implemented as a detector signal the signal processor may be included to process the detector signal and determine whether the monitored space is occupied.

Switch control logic 74 controls a power switch 76 in response to an occupancy signal from the receiver and/or the signal processor. The switch control logic 74 may also control one or more additional power switches 78. A power switch may include any suitable form of isolated or non-isolated power switch including an air-gap relay, solid state relay, or other switch based on SCRs, triacs, transistors, etc. The switch may provide power switching in discrete steps such as on/off switching, with or without intermediate steps, or continuous switching such as dimming control.

A user interface may be included to enable a user to configure the system, adjust parameters, etc. For example, the user interface may enable a user to set an unoccupied delay time, detector sensitivity, learn mode, etc. As with the occupancy sensor as described above, a user interface on a portable switching device may be implemented with any level of sophistication from a simple push-button switch, to a keypad with full text display, etc. For example, in some embodiments, a user interface may include a trimming potentiometer (trim pot) to set a delay time for unoccupied mode.

The power connections to the power switches may be implemented in any suitable form. For example, in some embodiments, the input power connection 82 may include a standard grounded or ungrounded power cord with a plug for connection to a wall receptacle. In other embodiments, the input power connection may include a screw base to connect the switching device to a standard screw-type light socket. In embodiments that include more than one power switch, additional power inputs 84 may be connected to the same or separate input power connections.

Since the portable switching device of FIG. 7 includes at least one power connection 82 or 84, one of these connections may be utilized as a source of power to operate the wireless receiver, signal processor, user interface, logic, etc. Alternatively, a separate power source such as one ore more batteries, PV cells, etc. may be used as a primary or back-up source of power to operate this circuitry.

The connection from a power switch to a load may also be implemented in any suitable form. For example, in some embodiments, the connection 86 from the switch 76 may include a receptacle for a standard power plug, a ground fault circuit interupter (GFCI), a screw socket for a standard light bulb or other type of lamp holder, etc. In an embodiment having two power switches in a power strip, one of the switches may be configured to switch power to one or more receptacles in response to the wireless signal from an occupancy sensor under control of the switch control logic, while the other switch may be configured to switch a separate group of receptacles on at all times, or only turn off in response to a master on-off switch on the power strip.

In another embodiment having two power switches in a power strip, the two switches may both be configured to be controlled by the wireless signal from an occupancy sensor, but the switch control logic may cause the two switches to control separate groups of receptacles on the power strip with different delay times.

In some other embodiments, the switch control logic may also be configured to provide various types of overrides such as manual or timer overrides of the occupancy sensor for certain loads. For example, on a power strip, a specific receptacle for a coffee maker may be configured to remain energized for a fixed length of time, regardless of occupancy, to assure a completely brewed pot of coffee. The user interface may be configured to enable a user to select a specific receptacle and designate the override time and other parameters.

As another example with a power strip, a receptacle for a networked printer that is normally controlled by the occupancy sensor may be manually and temporarily overridden to remain on, for example, if the occupant knows that others will be sending network print jobs to the printer while the occupant is away from the monitored space.

As yet another example with a power strip, one group of receptacles for devices such as a monitor, printer, background music, etc., may be configured to turn off after the monitored space is unoccupied for 10 minutes, while a second group of receptacles for devices such as a computer CPU may be configured to turn off after the monitored space is unoccupied for one hour.

As with other embodiments, the logic and circuitry in the embodiment of FIG. 7 may be implemented with analog and/or digital hardware, software, firmware, etc., or any combination thereof.

Figure 8:
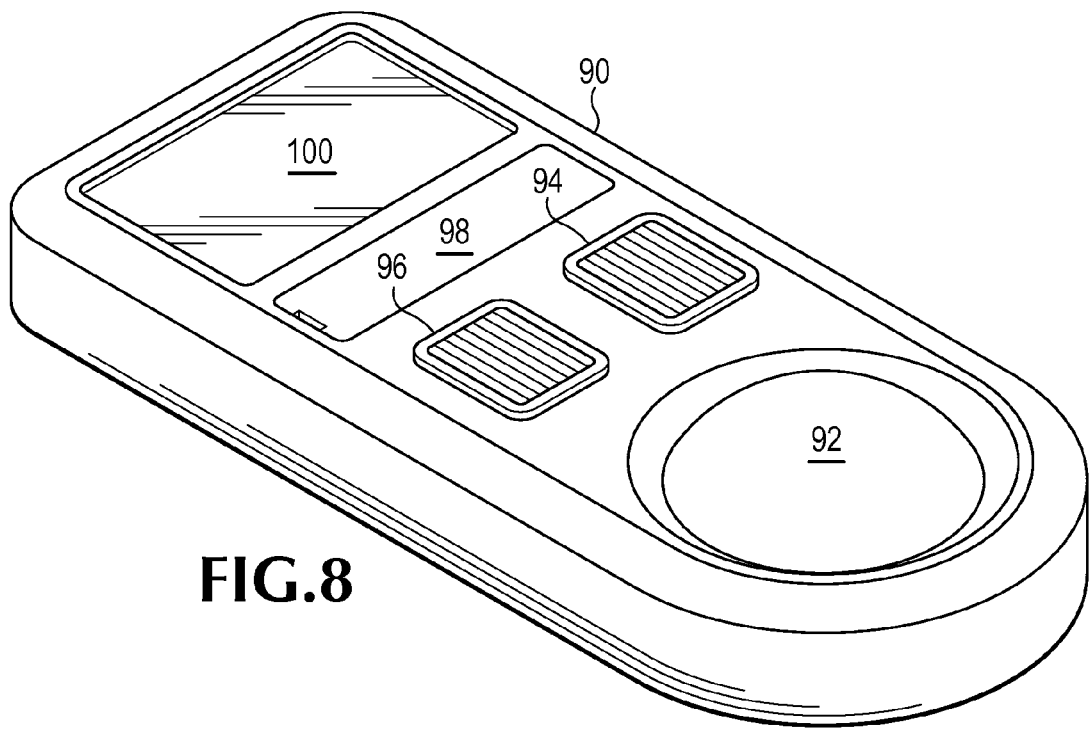
FIG. 8 illustrates an embodiment of a wireless occupancy sensor according to some of the inventive principles of this patent disclosure.

FIG. 8 illustrates an embodiment of a wireless occupancy sensor according to some of the inventive principles of this patent disclosure. The embodiment of FIG. 8 includes a PIR detector 92 in a housing 90 that may be mounted permanently to a building with screws, clips, glue, etc., mounted temporarily to a building, for example, with removable or repositionable two-sided tape, hook-and-loop fasteners, etc., or left unattached on a shelf, desk, cabinet, etc., in a location that provides the PIR sensor with an adequate field of view of the monitored space.

In this example, the occupancy sensor also includes a photovoltaic (PV) cell 100 to provide the primary source of power for the sensor and recharge one or more batteries on which the occupancy sensor runs when inadequate ambient light is available. An access cover 98 may provide access to controls for the PIR sensing operation such as range, sensitivity, field of interest, learn mode, etc.

In some embodiments, the occupancy sensor may include one or more additional detectors 94 and 96 which may include, for example, ultrasonic transducers, audio transducers, etc., or any combination thereof.

In this embodiment, the occupancy sensor may communicate with one or more portable switching devices through an RF transmitter which may be enclosed within the housing if it is fabricated from plastic or other material that does not block RF signals. The RF transmitter may be configured to flood the entire monitored space with the RF signal to enable any portable switching devices in the space to respond to the occupancy sensor. In some embodiments, multiple wireless occupancy sensors may be configured to operate on different frequencies. In other embodiments, an occupancy sensor may be configured to send different wireless occupancy signals on different frequencies, for example, occupancy signals having different delay times may be transmitted by the same occupancy sensor on different frequencies.

The type of wireless signal or signals transmitted by the occupancy sensor may depend on the type, if any, of signal processing functionality in the occupancy sensor. As discussed above, in some embodiments with little or no signal processing capacity, the occupancy sensor may broadcast a primitive or only slightly processed detector signal. In such embodiments, the elimination or reduction of signal processing at the occupancy sensor may reduce the power consumed and therefore, extend the battery life, reduce the size of the PV cell, etc. In other embodiments with more signal processing capacity, the occupancy sensor may broadcast a high-level binary occupancy signal.

Although the embodiment of FIG. 8 is shown in the context of an RF transmitter and PIR or U/S or audio detectors, the inventive principles may also be applied to embodiments that use other wireless communication technologies such as infrared and other occupancy sensing technologies.

Figure 9:
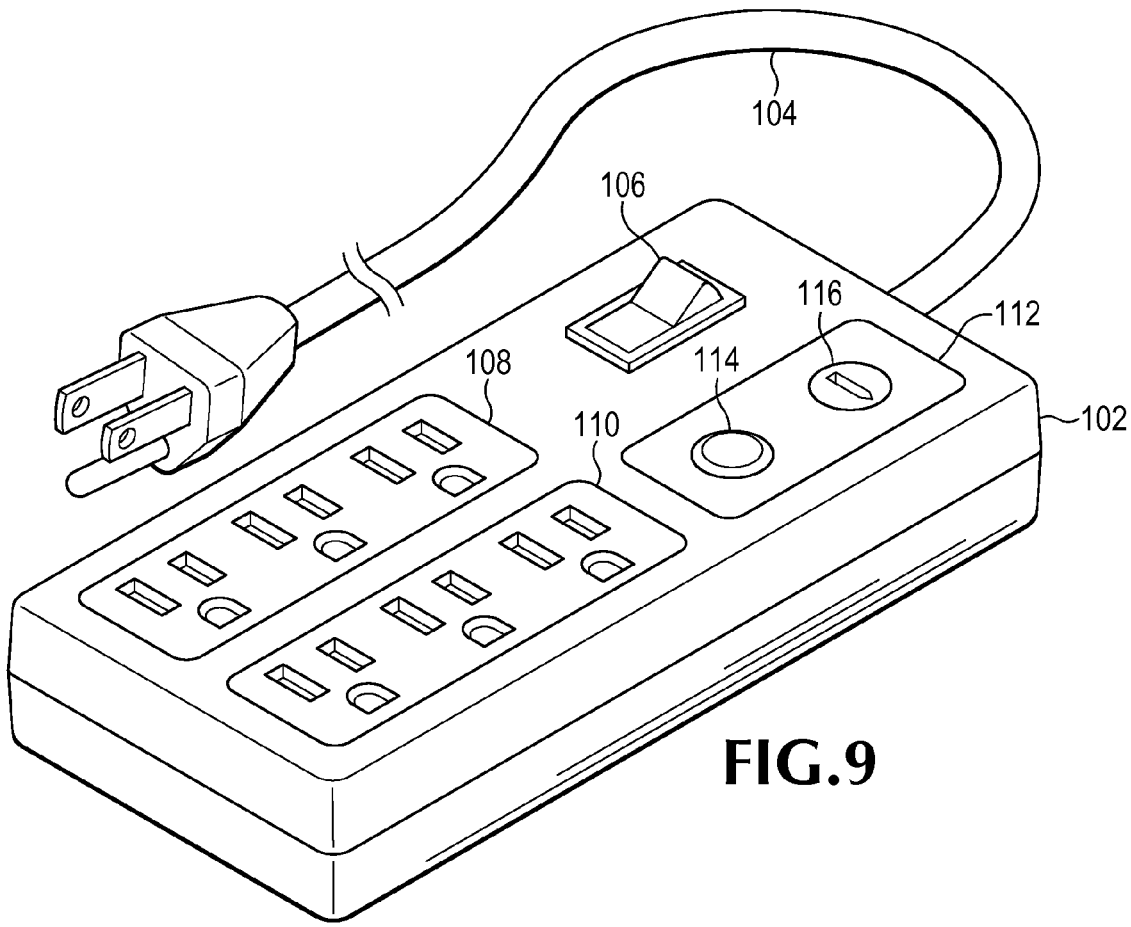
FIG. 9 illustrates an embodiment of a power strip having portable power switching for an occupancy sensing system according to some of the inventive principles of this patent disclosure.

FIG. 9 illustrates an embodiment of a power strip having portable power switching for an occupancy sensing system according to some of the inventive principles of this patent disclosure. The embodiment of FIG. 9 includes a housing 102 having a power cord 104 that can be plugged into a standard power receptacle. A first group of receptacles 108 is controlled only by a master switch 106. A second group of receptacles 110 is also controlled by the master switch, but may also be controlled by a portable switching device 112 in response to a wireless signal from an occupancy sensor. A wireless receiver 114 receives the wireless signal from the occupancy sensor and controls the second group of receptacles 110 accordingly. In this embodiment, a user interface includes a trim pot 116, but other embodiments may include a potentiometer with a knob, an optical encoder, a keypad and display, or any other type of user interface, or no user interface. The trim pot 116 in this embodiment enables a user to set a custom time delay for the switches receptacles 110.

In other embodiments, two or more groups of receptacles may be arranged to turn off with different time delays in response to a wireless signal from an occupancy sensor. For example, one group of receptacles may be configured to turn off with a short time delay after the monitored space becomes unoccupied, while another group of receptacles may be configured to turn off with a longer time delay. Such an embodiment may include a user interface with two separately operable user inputs for setting the time delay. Alternatively, one time delay may be pre-programmed or hard wired into the power strip, while a use is able to adjust the other time delay. In one example of an end-user configuration, a power strip with multiple groups of receptacles may be set up with a task light, printer, and computer monitor plugged into the group that turns off quickly, whereas a computer CPU and coffee mug warmer may be plugged into the group having a longer delay time. To facilitate an orderly shutdown of the CPU, the power strip or other portable switching device may include a communication interface to transmit a message to the CPU in advance of powering down to enable the CPU to initiate a shutdown sequence.

As discussed above, the wireless signal from the occupancy sensor may be implemented as a high-level occupancy signal, a low-level detector signal, or some combination thereof. The portable switching device 112 may have any suitable amount of signal processing functionality depending on the type of wireless signal transmitted by the occupancy sensor. The portable switching device 112 may include switch control logic to implement any of the control techniques discussed above, including those described with respect to FIG. 7, or any other control technique that takes advantage of a wireless signal from an occupancy sensor.

Figure 10:
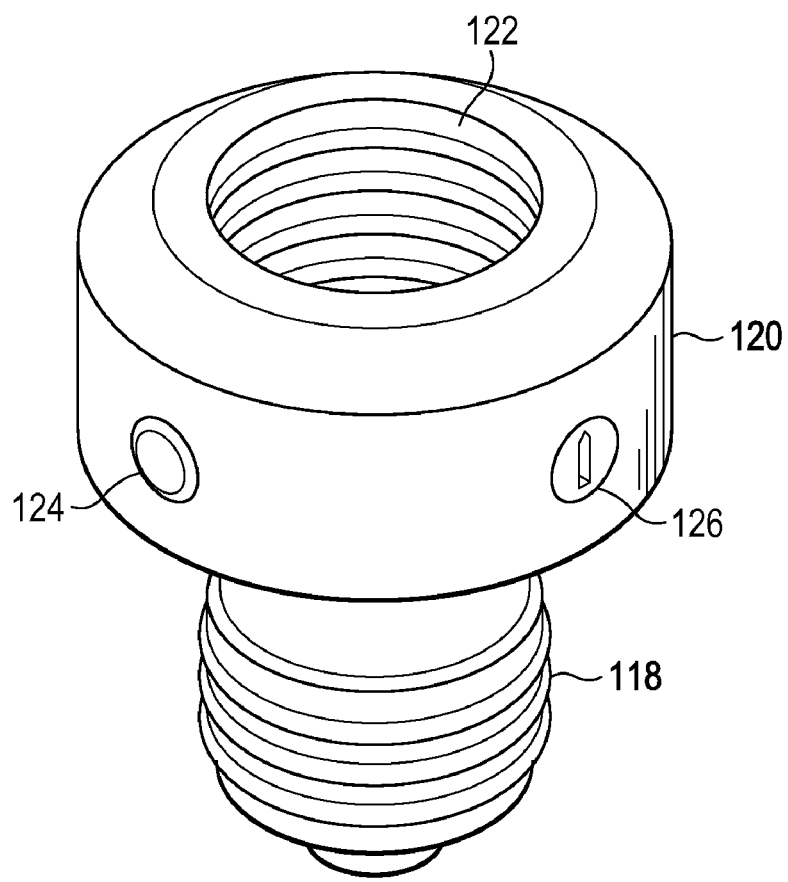
FIG. 10 illustrates an embodiment of a portable power switching device for an occupancy sensing system according to some of the inventive principles of this patent disclosure.

FIG. 10 illustrates an embodiment of a portable power switching device for an occupancy sensing system according to some of the inventive principles of this patent disclosure. The embodiment of FIG. 10 is configured as a light bulb adapter and includes a body 120 having a screw base 118 that can be mounted in a screw-type lamp socket. A screw-in socket 122 enables an incandescent lamp, compact fluorescent lamp (CFL) or other load to be connected to the adapter. A switch in the body operates in response to a wireless signal from an occupancy sensor received by a wireless receiver 124. A dial 126 enables the user to manually set a custom delay time.

As with the embodiment of FIG. 9, the wireless signal from the occupancy sensor may be implemented as a high-level occupancy signal, a low-level detector signal, or some combination thereof. The embodiment of FIG. 10 may include any suitable amount of signal processing functionality depending on the type of wireless signal transmitted by the occupancy sensor.

Figure 11:
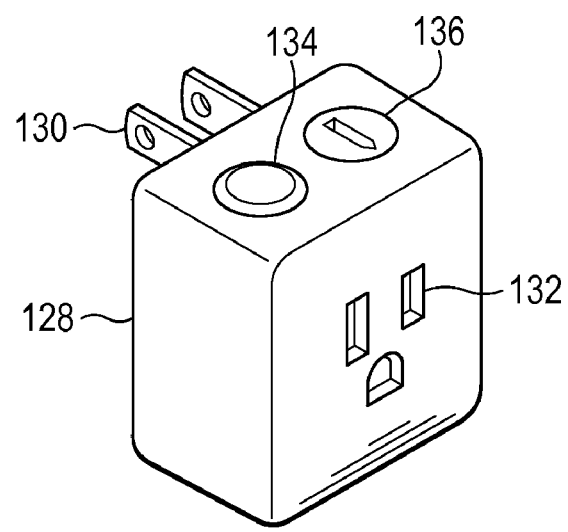
FIG. 11 illustrates an embodiment of a portable power switching device for an occupancy sensing system according to some of the inventive principles of this patent disclosure.

FIG. 11 illustrates an embodiment of a portable power switching device for an occupancy sensing system according to some of the inventive principles of this patent disclosure. The embodiment of FIG. 11 is configured as a portable in-line power switch and includes a body 128 having blades to form a power plug 130 extending from the back of the body to connect the device to a standard wall receptacle. A receptacle 132 is formed in the front of the body. A power switch inside the body controls the flow of power from the plug 130 to the receptacle 132 in response to a wireless signal from an occupancy sensor received by a wireless receiver 134. A dial 136 enables the user to manually set a custom delay time.

As with the embodiments of FIG. 9 and FIG. 10, the wireless signal from the occupancy sensor may be implemented as a high-level occupancy signal, a low-level detector signal, or some combination thereof. The embodiment of FIG. 11 may also include any suitable amount of signal processing functionality depending on the type of wireless signal transmitted by the occupancy sensor.

Figure 12:
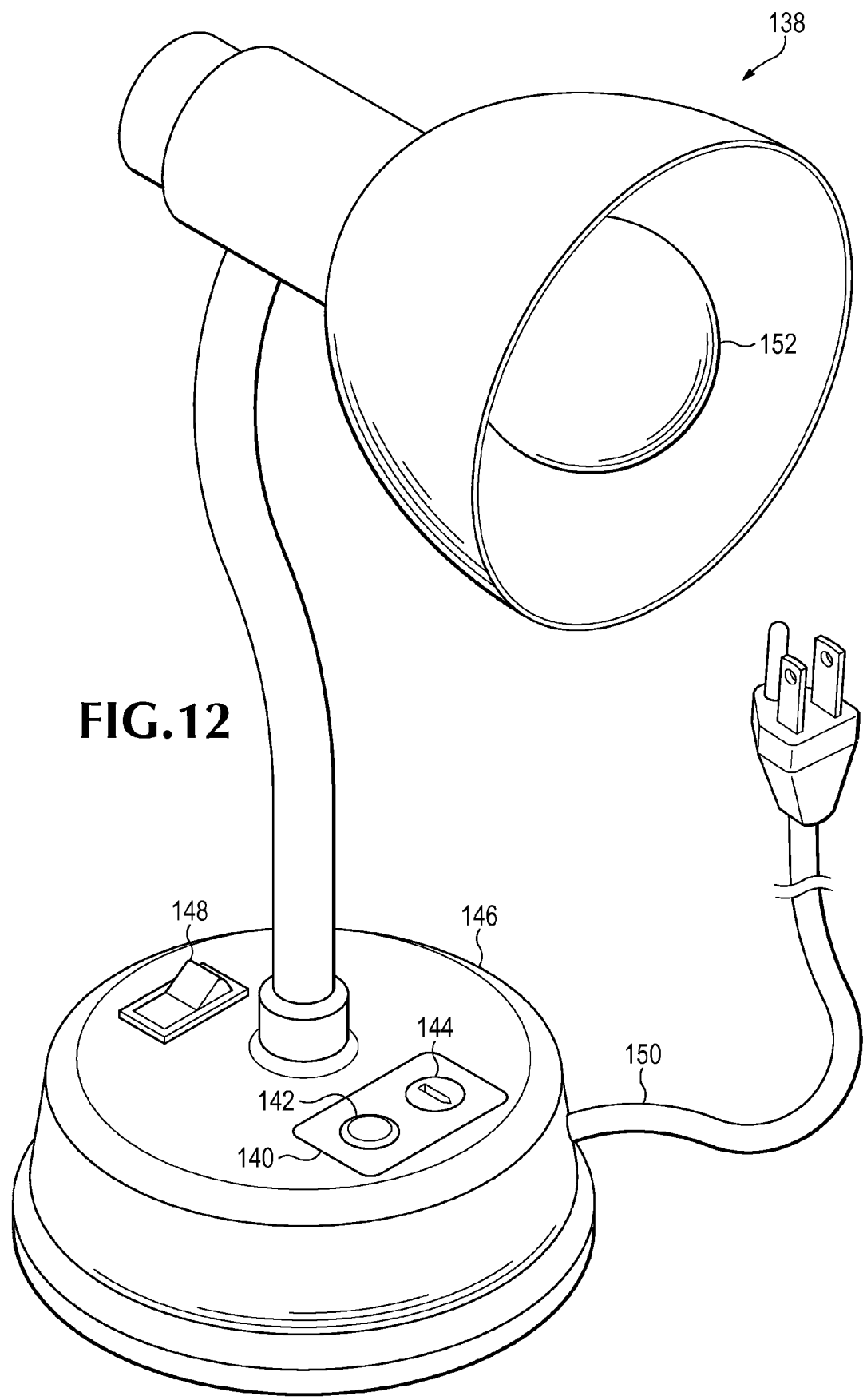
FIG. 12 illustrates an embodiment of an appliance having portable power switching for an occupancy sensing system according to some of the inventive principles of this patent disclosure.

FIG. 12 illustrates an embodiment of an appliance having portable power switching for an occupancy sensing system according to some of the inventive principles of this patent disclosure. In the embodiment of FIG. 12, a portable power switching device 140 is integrated directly into the appliance 138, which in this example is a task light, but could be any other suitable electrical appliance. The portable power switching device 140 is mounted in a base 146 of the task light which may be plugged in to a wall receptacle through a power cord 150. A power switch inside the portable power switching device controls the flow of power from the cord 150 to a lamp 152 in response to a wireless signal from an occupancy sensor received by a wireless receiver 142. A dial 144 enables the user to manually set a custom delay time. A master switch 148 may completely de-energize the entire appliance.

As with the embodiments of FIG. 9 through FIG. 11, the wireless signal from the occupancy sensor may be implemented as a high-level occupancy signal, a low-level detector signal, or some combination thereof. The embodiment of FIG. 12 may also include any suitable amount of signal processing functionality depending on the type of wireless signal transmitted by the occupancy sensor.

Some additional inventive principles of this patent disclosure relate to the use of a time clock in a wireless occupancy sensing system. An example is illustrated in the embodiment of FIG. 12 where the appliance includes a time clock to enable various clock-based control techniques to be combined with other inventive features. An LCD display 141 and keypad 143 enable a user to configure the clock and appliance so that the appliance operates differently during different time periods. For example, the clock may be programmed with a normal schedule such as 8:00 am to 5:00 pm on weekdays. The appliance may be configured so that it only responds to the wireless signal from an occupancy sensor during normal work hours, but disregards the wireless signal, i.e., stays off, at other times. A manual override switch 145 may be included to enable a user to manually toggle the on/off state of the appliance during normal works hours, outside of normal work hours, or at any time.

The time clock may be implemented with any suitable mechanical and/or electrical platforms. In the embodiment of FIG. 12, the interface to the clock is shown as a display and keypad that enable configuration of the clock which may be implemented with a dedicated microcontroller, or with a microcontroller that implements some or all of the other functions of the appliance such as wireless reception, time delay, power switch control, manual override, etc. In other embodiments, the time clock may be implemented with a rotating mechanical timer with a dial face having trippers arranged around the face to trigger on/off events by closing and opening mechanical contacts as the dial face turns. In some embodiments, the clock may include an astronomical adjustment to adjust time settings based on seasons or time of year. In an electrical implementation, a clock may be realized with digital and/or analog hardware, software, firmware, etc., or any combination thereof.

The keypad 143 may include left/right select buttons to scroll through and select parameters, and up/down increment-decrement buttons to change a selected parameter. Example parameters may include time-of-day or day-of week settings, start and end points for control time periods, configuration of power switch response to control time periods, enable or disable manual override, etc.

Although illustrated in the context of an appliance, the inventive principles relating to time clocks may also be applied to other portable switching devices such as power strips, lamp holders, etc., as well as local switching devices as described below.

Some of the inventive principles of this patent disclosure relate to the use of a local switching device in a wireless occupancy sensing system. A local switching device may have a structure similar to any of the embodiments of portable switching devices described above with respect to FIG. 1 through FIG. 6. Rather than being portable, however, it may be local in the sense that it may be connected to a load without any additional building wiring between the local switching device and the load. For example, the local switching device may be implemented with a receptacle that is mounted in a wall outlet and configured to receive the wireless signal from the occupancy sensor. The switching device controls the flow of power to a load that is plugged in to the receptacle in response to the wireless signal.

Figure 13:
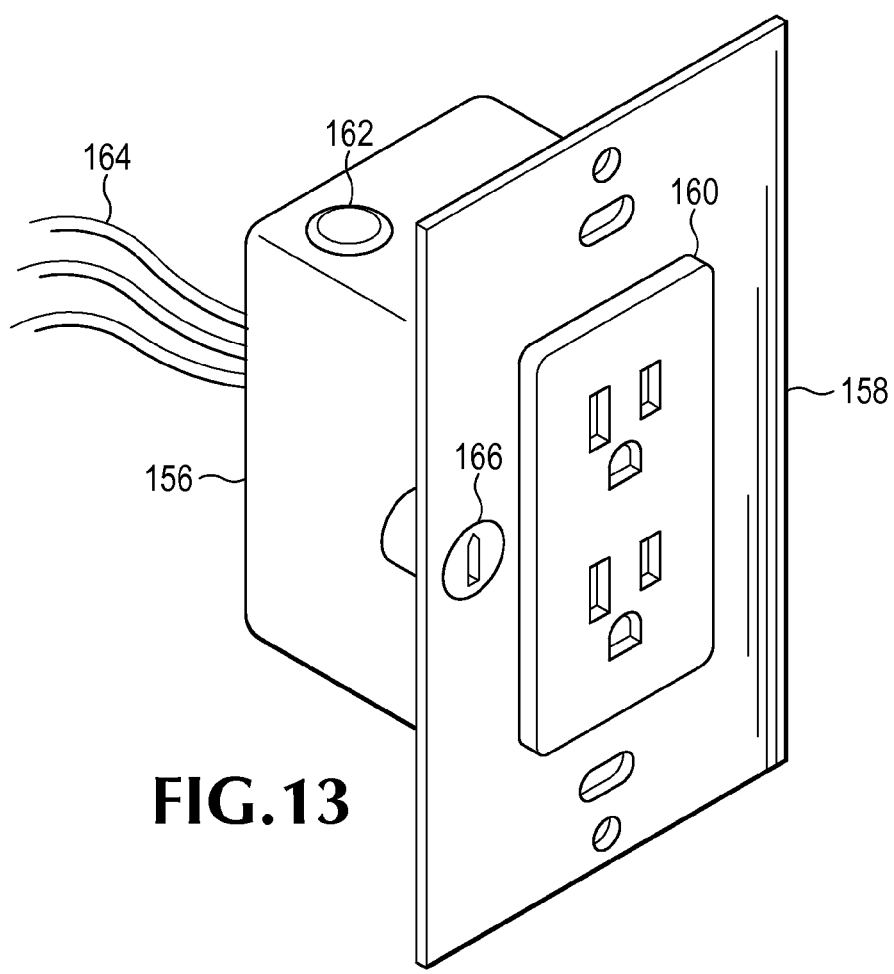
FIG. 13 illustrates an embodiment of a local power switch for a wireless occupancy sensing system according to some of the inventive principles of this patent disclosure.

FIG. 13 illustrates an embodiment of a local power switch for a wireless occupancy sensing system according to some of the inventive principles of this patent disclosure. The embodiment of FIG. 13 is configured as a wall outlet having a duplex receptacle 160. A mounting plate 158 enables the entire assembly to be mounted in a standard electrical wall box. The power switch, switch control logic, signal processing circuitry (if any), etc., may be enclosed in a housing 156. Power connections to the switch may be through pigtail wire leads 164 which may include hot, neutral, and ground connections for, e.g., a 120 VAC branch circuit.

The power switch inside the housing controls the flow of power from the wire leads to the duplex receptacle 160 in response to a wireless signal from an occupancy sensor received by a wireless receiver 162. A dial 166 may be included to enable the user to manually set a custom delay time. In this embodiment, the dial is located on the face mounting plate 158 so that it can be adjusted by removing the wall plate, but without having to remove the assembly from the wall box. In other embodiments, the dial or other user interface may be located directly on the receptacle, on or inside the housing, etc.

The wireless signal from the occupancy sensor may be implemented as a high-level occupancy signal, a low-level detector signal, or some combination thereof. The embodiment of FIG. 13 may include any suitable amount of signal processing functionality depending on the type of wireless signal transmitted by the occupancy sensor.

Although the embodiment of FIG. 13 is illustrated as a wall outlet with a receptacle, a local switching device may also be embodied in other forms such as a power pack, a screw-base lamp holder, etc.

Figure 14:
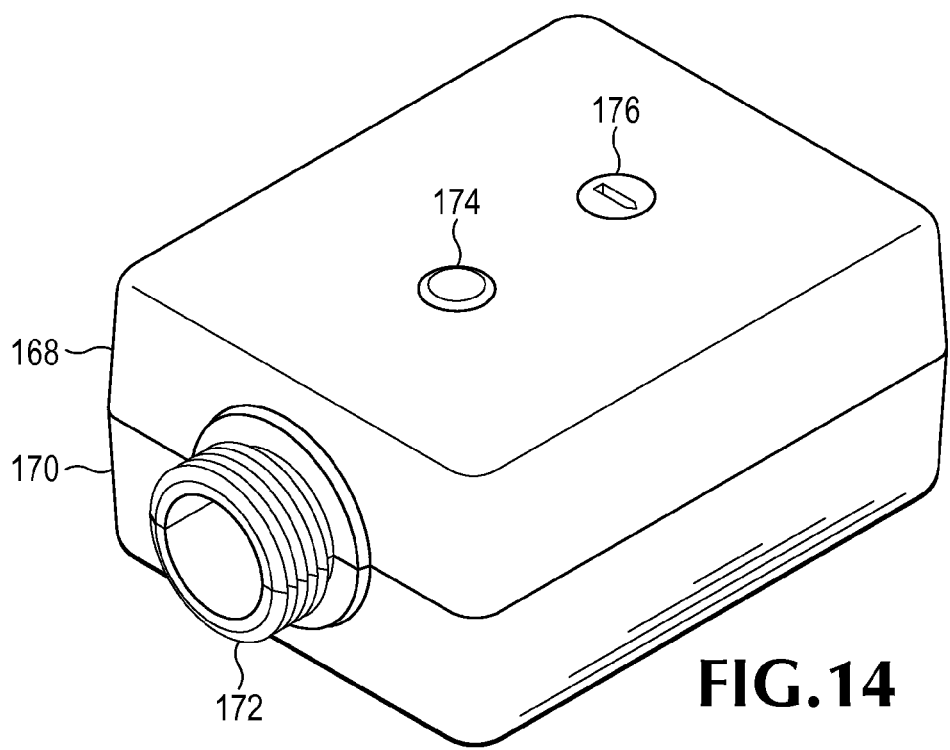
FIG. 14 illustrates another embodiment of a local power switch for a wireless occupancy sensing system according to some of the inventive principles of this patent disclosure.

FIG. 14 illustrates another embodiment of a local power switch for a wireless occupancy sensing system according to some of the inventive principles of this patent disclosure. The embodiment of FIG. 14 is configured as a power pack that may be mounted directly to a light fixture, exhaust fan, space heater, or other electrical load. The power pack includes an enclosure having two housing halves 168 and 170. A conduit connection 172 molded into the housing halves provides a mechanical connection to a load such as a light fixture. The power pack may include one or more power switches to control the flow of power to one or more loads. The switches may operate at relatively high voltages such as 120, 240 or 277 VAC as is commonly used in building wiring systems, although some embodiments may operate at other voltages such as 12 VDC, e.g., for landscape wiring. The power pack may also include a power supply to convert high-voltage power to a low-voltage source for operating the internal circuitry.

The power switch inside the housing controls the flow of power to the load in response to a wireless signal from an occupancy sensor received by a wireless receiver 174. A dial 176 may be included to enable the user to manually set a custom delay time.

The wireless signal from the occupancy sensor may be implemented as a high-level occupancy signal, a low-level detector signal, or some combination thereof. The embodiment of FIG. 14 may include any suitable amount of signal processing functionality depending on the type of wireless signal transmitted by the occupancy sensor.

The inventive principles of this patent disclosure have been described above with reference to some specific example embodiments, but these embodiments can be modified in arrangement and detail without departing from the inventive concepts. For example, some of the embodiments have been described in the context of lighting loads, but the inventive principles apply to other types of electrical loads as well. Any of the circuitry and logic described herein may be implemented in analog and/or digital hardware, software, firmware, etc., or any combination thereof. As another example, some of the embodiments have been described in the context of interior building spaces, but the inventive principles apply to exterior or hybrid spaces as well. Such changes and modifications are considered to fall within the scope of the following claims.

The invention claimed is:

1. A method comprising:
receiving a wireless signal from an occupancy sensor; and
controlling power in response to the wireless signal;
where the occupancy sensor includes only a limited source of power to transmit the wireless signal;
where the wireless signal is received at a power or surge strip having a power cord with an electrical plug with prongs to receive power from an electrical receptacle such that the power or surge strip can be removed from an interior or exterior building space without disconnecting any permanent building wiring;
where the power or surge strip includes multiple receptacles and a master switch to control the flow of power from the electrical plug to one or more of the receptacles;
where the power or surge strip includes processing logic to implement an unoccupied time delay and a user interface to adjust the unoccupied time delay;
where the flow of power from the master switch to at least one of the multiple receptacles is controlled by a power switch at the power or surge strip in response to the wireless signal; and
where the power switch turns off the flow of power from the master switch to at least one of the multiple receptacles after delaying for an unoccupied time delay after no longer receiving a subsequent wireless signal from the occupancy sensor.

2. The method of claim 1 where the wireless signal comprises an occupancy signal.

3. The method of claim 1 where the wireless signal comprises a detector signal.

4. The method of claim 1 further comprising controlling power to the at least one receptacle in response to a clock.

5. The method of claim 1 further comprising transmitting a message from the power or surge strip in response to the wireless signal from the occupancy sensor.

6. The method of claim 5 where the message is transmitted in advance of controlling the power switch.

7. The method of claim 1 where the user interface comprises a dial.

8. The method of claim 1 where the user interface comprises a keypad and display.

9. The method of claim 1 where the limited source of power comprises a battery.

10. The method of claim 1 where the limited source of power comprises a solar cell.

11. A system comprising:
an occupancy sensor to transmit a wireless signal in response to detecting occupancy within a space;
where the occupancy sensor includes only a limited source of power to transmit the wireless signal;
a wireless receiver for receiving the wireless signal from the occupancy sensor; and
a power switch to control power in response to the wireless signal;
where the wireless receiver and power switch are included in a power or surge strip having a power cord with an electrical plug with prongs to receive power from an electrical receptacle such that the power or surge strip can be removed from an interior or exterior building space without disconnecting any permanent building wiring;
where the power or surge strip includes multiple receptacles and a master switch to control the flow of power from the electrical plug to the multiple receptacles;
where the power or surge strip includes processing logic to implement an unoccupied time delay and a user interface to adjust the unoccupied time delay;
where the power switch controls the flow of power from the master switch to at least one of the multiple receptacles; and
where the power switch turns off the flow of power from the master switch to at least one of the multiple receptacles after delaying for an unoccupied time delay after no longer receiving a subsequent wireless signal from the occupancy sensor.

12. The system of claim 11 where the power or surge strip comprises a ground fault circuit interrupter.

13. The method of claim 11 where the user interface comprises a dial.

14. The method of claim 11 where the user interface comprises a keypad and display.

15. The method of claim 11 where the limited source of power comprises a battery.

16. The method of claim 11 where the limited source of power comprises a solar cell.

17. A system comprising:
an occupancy sensor including a detector for sensing an occupant's presence within a space and a transmitter for transmitting a wireless signal in response to detecting the presence of an occupant within the space; and
a power or surge strip having a power cord with an electrical plug with prongs to receive power from an electrical receptacle, the power or surge strip further including a plurality of receptacles, a wireless receiver for receiving the wireless signal from the occupancy sensor, a power switch, a master switch for controlling the flow of power from the electrical plug to at least one of the plurality of receptacles; processing logic for implementing an unoccupied time delay, and a user interface to adjust the unoccupied time delay;
wherein the power switch turns off the flow of power from the master switch to at least one of the plurality of receptacles after delaying for the unoccupied time delay after no longer receiving a subsequent wireless signal from the occupancy sensor.

18. The system of claim 17, where the user interface comprises a dial.

19. The system of claim 17, where the user interface comprises a keypad and display.

* * * * *